(12) United States Patent
Passen et al.

(10) Patent No.: US 6,364,576 B1
(45) Date of Patent: Apr. 2, 2002

(54) FLOATING DOCK INCLUDING CLIPS FOR UTILITY LINES

(75) Inventors: Selvin Passen, Zephyr Cove, NV (US); Mark Levin, Baltimore, MD (US)

(73) Assignee: Eastern Floatation Systems, Inc., Baltimore, MD (US)

( * ) Notice: Subject to any disclaimer, the term of this patent is extended or adjusted under 35 U.S.C. 154(b) by 0 days.

(21) Appl. No.: 09/492,148

(22) Filed: Jan. 27, 2000

(51) Int. Cl.[7] .............................................. B63B 35/44
(52) U.S. Cl. ....................................... 405/219; 114/267
(58) Field of Search ................................. 405/219, 218, 405/220, 221; 114/264, 266, 267

(56) References Cited

U.S. PATENT DOCUMENTS

| | | | |
|---|---|---|---|
| 2,857,872 A | 10/1958 | Usab | |
| RE24,837 E | 6/1960 | Usab | |
| 3,091,203 A | 5/1963 | Usab | |
| 3,128,737 A | 4/1964 | Usab | |
| 4,318,362 A | 3/1982 | Jung | |
| 4,559,891 A | 12/1985 | Shorter, Jr. | |
| 4,683,833 A | 8/1987 | Meriwether | |
| 4,709,647 A | 12/1987 | Rytand | |
| 4,715,307 A | 12/1987 | Thompson | |
| 4,799,445 A | 1/1989 | Meriwether | |
| 4,887,654 A | 12/1989 | Rytand | |
| 4,940,021 A | 7/1990 | Rytand | |
| 4,947,780 A | 8/1990 | Finn | |
| 4,974,538 A | 12/1990 | Meriwether | |
| 5,044,296 A | 9/1991 | Finn | |
| 5,081,946 A | 1/1992 | Nannig et al. | |
| 5,199,371 A | 4/1993 | Meriwether | |

*Primary Examiner*—David Bagnell
*Assistant Examiner*—Frederick L. Lagman
(74) *Attorney, Agent, or Firm*—Lowe Hauptman Gilman & Berner, LLP (57) ABSTRACT

A floating dock includes sheet metal clips on its outboard side. The clips carry utility lines that extend into a utility tower mounted on one of many inter-connected buoyant wharf modules forming the dock. The clip, in combination with wales that connect the outboard sides of the modules together, provide an enclosed volume for the utility lines. Contact between the utility lines and a metal base of the clips is prevented by a pair of electric insulating sleeves, each having a slot that fits into each edge of utility clip base. The module carrying the tower includes a tunnel and a depression in a deck of the dock, under the tower. Utility lines from a side of the modules opposite from the side carrying the clips extend through the tunnel, into the tower via the depression. Utility lines in the clips go into the tower via the depression and aligned openings in the tower base and depression.

21 Claims, 5 Drawing Sheets

FLOATING DOCK INCLUDING CLIPS FOR UTILITY LINES

FIELD OF THE INVENTION

The present invention relates generally to floating docks and more particularly to such docks with clips for carrying utility lines connected to an outboard side of the dock.

BACKGROUND ART

Floating docks for yachts and other types of vessels frequently include utility lines extending along or within buoyant wharf modules forming the dock. The utility lines typically extend to utility towers on outboard sides of the dock, for connection to the yachts and other vessels.

The co-pending, commonly assigned, application entitled "Floating Dock Including Buoyant Wharf Modules and Method of Making Such Modules," Lowe Hauptman Gopstein Gilman & Berner Docket 4432-001, filed Oct. 25, 1999, discloses an arrangement wherein utility lines extend along a floating dock including two rows of side-by-side modules having a lengthwise gap between them. The utility lines extend in tubes connecting the side-by-side modules together.

The arrangements disclosed in our co-pending application, as well as in other prior art patents, wherein the utility lines extend along the interior of the dock, have the disadvantage of difficult access to the utility lines when maintenance of the lines is required. In addition, the amount of space available for the utility lines is frequently insufficient to provide communication and power to a substantial number of yachts and other vessels that dock at relatively large floating docks. Access from the utility lines in the interior of the dock to the utility towers on the outboard side of the dock is somewhat difficult in many of the prior art arrangements.

Finn, U.S. Pat. No. 4,947,780, discloses an arrangement wherein wales on an outboard side of floating wharf modules of a floating dock carry brackets for holding utility lines, such as water and fuel lines. The brackets are arranged so that a floor of the bracket carries a water or fuel line. The line occupies a volume between vertical walls of each bracket and each float module to which each bracket is connected by two or more side-by-side wales. The floor has an edge spaced from each module so there is a gap between the bracket and the buoyant module side wall. A lag bolt extending vertically into a bottom face of a wale connects the bracket to the wale.

A disadvantage of the Finn structure is that utility lines the bracket floor carries can possibly slip through the gap between the bracket and the module side wall. In addition, the floor of the bracket which carries the utility lines can bend, either under the load of the utility lines or in response to external forces applied to the bracket, for example, in response to a collision between a vessel and the dock.

It is, accordingly, an object of the present invention to provide a new and improved floating dock with a new and improved structure for carrying utility lines.

Another object of the present invention is to provide a new and improved floating dock having a structure for carrying utility lines on an outboard side of the dock, wherein the structure is arranged so that the possibility of the utility lines falling from the structure is virtually eliminated.

An additional object of the invention is to provide a new and improved floating dock having a structure for carrying utility lines on an outboard side of the dock.

Still an additional object of the invention is to provide a new and improved floating dock having a structure for carrying utility lines on an outboard side of the dock and wherein a rod which is used to hold a wale in place also holds one end of the structure in place.

SUMMARY OF THE INVENTION

One aspect of the invention relates to a floating dock for carrying utility lines that comprises an elongated pier portion including a wale arrangement on an elongated outboard side. Plural utility clips carrying the utility lines are fixedly mounted to the wale arrangement and the outboard side. The utility clips are arranged and positioned to completely enclose a volume in which the utility lines can be located.

Another aspect of the innovation concerns a floating dock for carrying utility lines that comprises an elongated pier portion including a wale arrangement on an elongated outboard side. Plural utility clips carrying the utility lines are fixedly mounted on the wale arrangement and the elongated outboard side. Plural transverse rods extend to the elongated outboard, side. Each of the clips includes a wall with an opening through which one of the rods extends. A fastener arrangement connects the rods to the wale arrangement. The fastener arrangement causes a force to be exerted on the wale arrangement and the wall to hold the wall of each clip in place relative to the wale arrangement.

In a preferred embodiment, the wale arrangement includes first and second wales having adjacent sides. The wall fits between and abuts the adjacent sides so the adjacent sides exert a compressive force on the wall to hold the wall in situ.

The wale arrangement also preferably includes a third wale having a side abutting a side of another wale of the wale arrangement. The first and second wales are between the third wale and the remainder of the dock. The third wale has a surface abutting and fixedly connected to a surface dock of the clip.

The dock preferably includes a plurality of wharf modules. On of the rods and plural further rods extend transversely of each of the modules and through the wale arrangement. The fastener arrangement holds all the rods, modules and wales together.

An additional aspect of the invention concerns a floating dock for carrying utility lines that comprises an elongated pier portion having an elongated outboard first side and another elongated second side substantially parallel to and opposite from the first side. Plural utility clips mounted on the first side carry some of the utility lines. A structure mounted on the second side carries others of the utility lines. A structure mounts a utility tower in proximity to one of the sides on a deck of the dock. The dock includes a solid buoyant lower portion having a tunnel extending between the first and second sides for carrying at least one utility line from the side opposite to the one side to the one side. The tunnel ends on the one side close to the mounting structure so that the utility line extending through the tunnel can extend into the utility tower.

Preferably the dock includes a depression in the one side. The depression includes an opening in the deck close to the mounting structure. The utility tower includes an opening in its base. The mounting structure and the openings in the deck and the base are such that the utility lines entering the tower go through the depression and the openings.

An added aspect of the invention relates to a floating dock for carrying utility lines that comprises an elongated pier portion having an elongated side. Plural utility clips fixedly mounted on the elongated side carry utility lines. Each of the clips has a metal floor carrying a non-metallic spacer arrangement extending above the floor for preventing contact of the utility lines with the floor.

Preferably the spacer arrangement for each clip includes a pair of tubes each having an elongated slit and made of an electric insulator. Each clip has opposite substantially parallel edges. One of the tubes is carried by each edge so that each edge extends into a slit of the tube associated with each edge.

The above and still further objects, features and advantages of the present invention will become apparent upon consideration of the following detailed descriptions of a specific embodiment thereof, especially when taken in conjunction with the accompanying drawings.

DETAILED DESCRIPTION OF THE DRAWING

Figure 1:
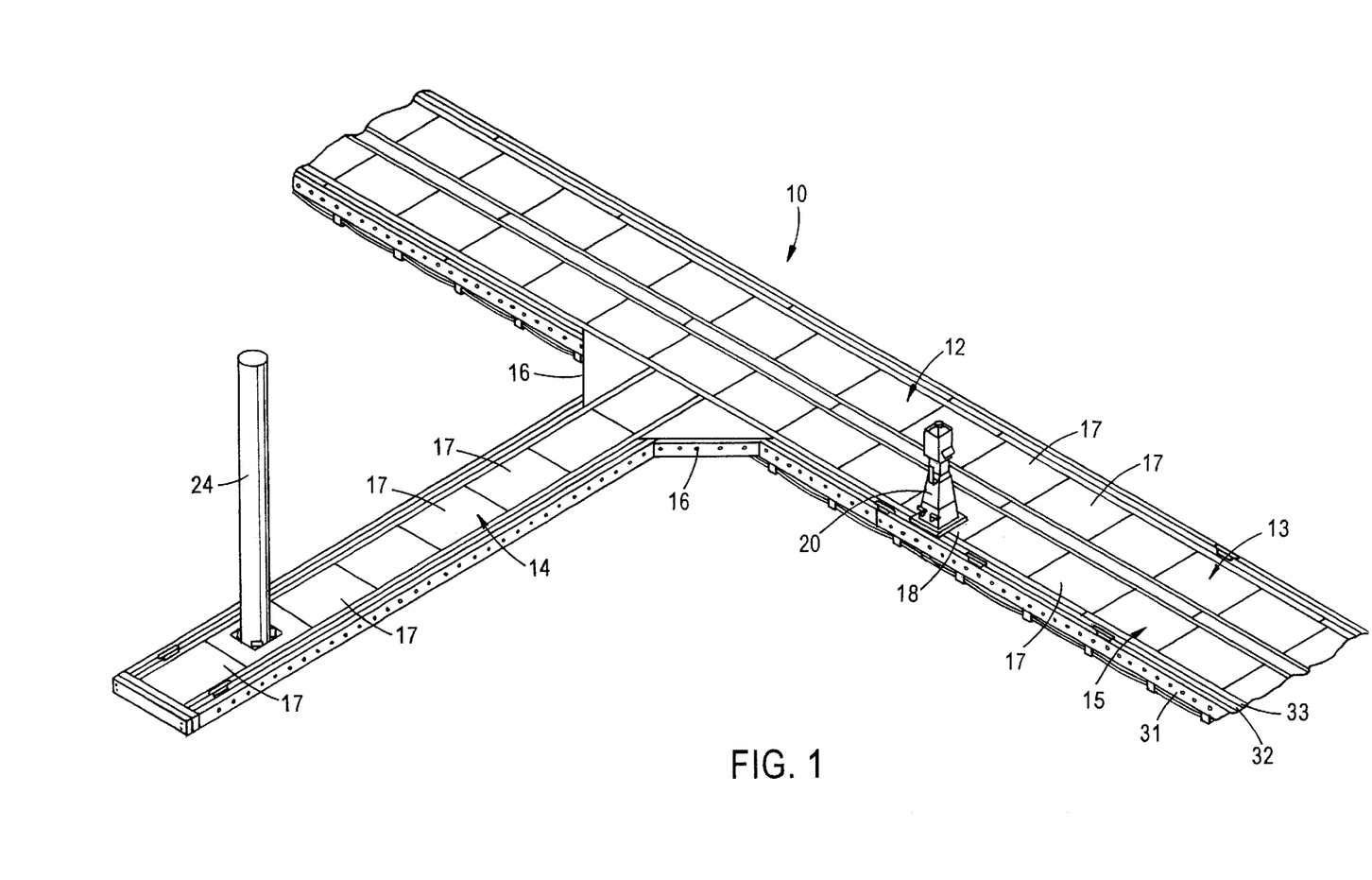
FIG. 1 is a perspective view of a floating dock including clips carrying utility lines mounted on buoyant wharf modules, in accordance with a preferred embodiment of the present invention.

Reference is now made to FIG. 1 of the drawing wherein floating dock 10 is illustrated as including main pier portion 12 and finger pier portion 14, which extends generally at right angles to the main pier portion. Main pier portion 12 includes first and second rows 13 and 15 of buoyant wharf modules, in side-by-side relationship with each other, while finger pier portion 14 includes a single row of buoyant wharf modules. Trusses 16 connect the modules of main pier portion 12 to the modules of finger pier portion 14.

All the buoyant wharf modules of finger pier portions 12 and 14 are constructed in the same manner, except for module 18 that carries utility tower 20 and module 22 that surrounds pile 24; module 22 is frequently referred to as a pile float. (For convenience, all of the identical modules of dock 10 are referred to by reference numeral 17, i.e., all of the modules of FIG. 1 are modules 17 except modules 18 and 22.)

All of modules 17, 18 and 22 have the same exterior shape and dimensions. In particular, each of modules 17, 18 and 22 has a right parallelepiped as an exterior shape, such that the exterior walls of the modules are straight and extend in the vertical plane. Each of modules 17, 18 and 22 typically has a length of about five feet, a width of about three feet, and a depth of about 26 inches. All of modules 17, 18 and 22 include (1) a closed cell buoyant foam mass 21 that fills lower sealed molded shell 23 made of an organic compound, and (2) a concrete deck 25. Deck 25 includes transverse tunnels 27. Rods 29 extend through the tunnels for connection to wales 31–33 that extend lengthwise of the modules. The densities of corresponding parts of the different modules are the same, so the buoyant properties of modules 17, 18 and 22 are substantially the same. Each of modules 17, 18 and 22 also includes provisions for draining water incident on the deck, as well as indentations 40 (FIGS. 5 and 7) in the bottom thereof for receiving forks of an industrial fork lift truck.

Abutting wales 31–33 are elongated wood boards, each having a rectangular cross section. Wale 31, which is farther from shell 23 than either of wales 32 and 33, has a greater height than wales 32 and 33, while wales 32 and 33 are thicker than wale 31. In a preferred embodiment, wale 31 is about two inches wide and eight inches high, while each of wales 32 and 33 is about three inches wide and five inches high.

Each of rods 29 has threaded ends and extends through aligned bores in wales 31–33. Each end of rod 29 is secured to a wale 31 on each longitudinal side of each module by a nut 36 and washer 38 combination that is counter sunk into a bore of wale 31.

The inboard longitudinal sides of side-by-side modules 17 and 18 of rows 13 and 15 are connected to each other by spacer tubes (not shown) and elongated rods 29, as disclosed in the previously mentioned co-pending application. Rods 29 extend through holes in the spacer tubes and are held in situ on the tubes by nut and washer combinations. Some utility lines extend longitudinally through the spacer tubes and a gap between the side-by-side modules of rows 13 and 15.

Further details of preferred configurations for all of modules 17, 18 and 22 are disclosed in the previously mentioned co-pending application and in a co-pending, commonly assigned application of Passen et al., entitled "Dock and Buoyant Module Adapted to be Connected to a Pile," Lowe Hauptman Gopstein Gilman & Berner Docket 4432-002 filed simultaneously with the present application. It is to be understood, however, that other types of buoyant modules can be employed for modules 17 and 22 and that certain aspects of the invention are not limited to the type of floating dock and modules disclosed in the co-pending applications.

Additional utility lines 200 extend along the length of the outboard side of the modules in row 13 of main dock portion 12. Utility clips 202, one of which is fixedly mounted on the outboard side of each of the modules of main dock portion 12, securely carry utility lines 200. One utility clip 202 is fixedly secured to each of the modules in rows 13. Each clip 202 extends approximately six inches along the length of its respective module.

Figure 7:
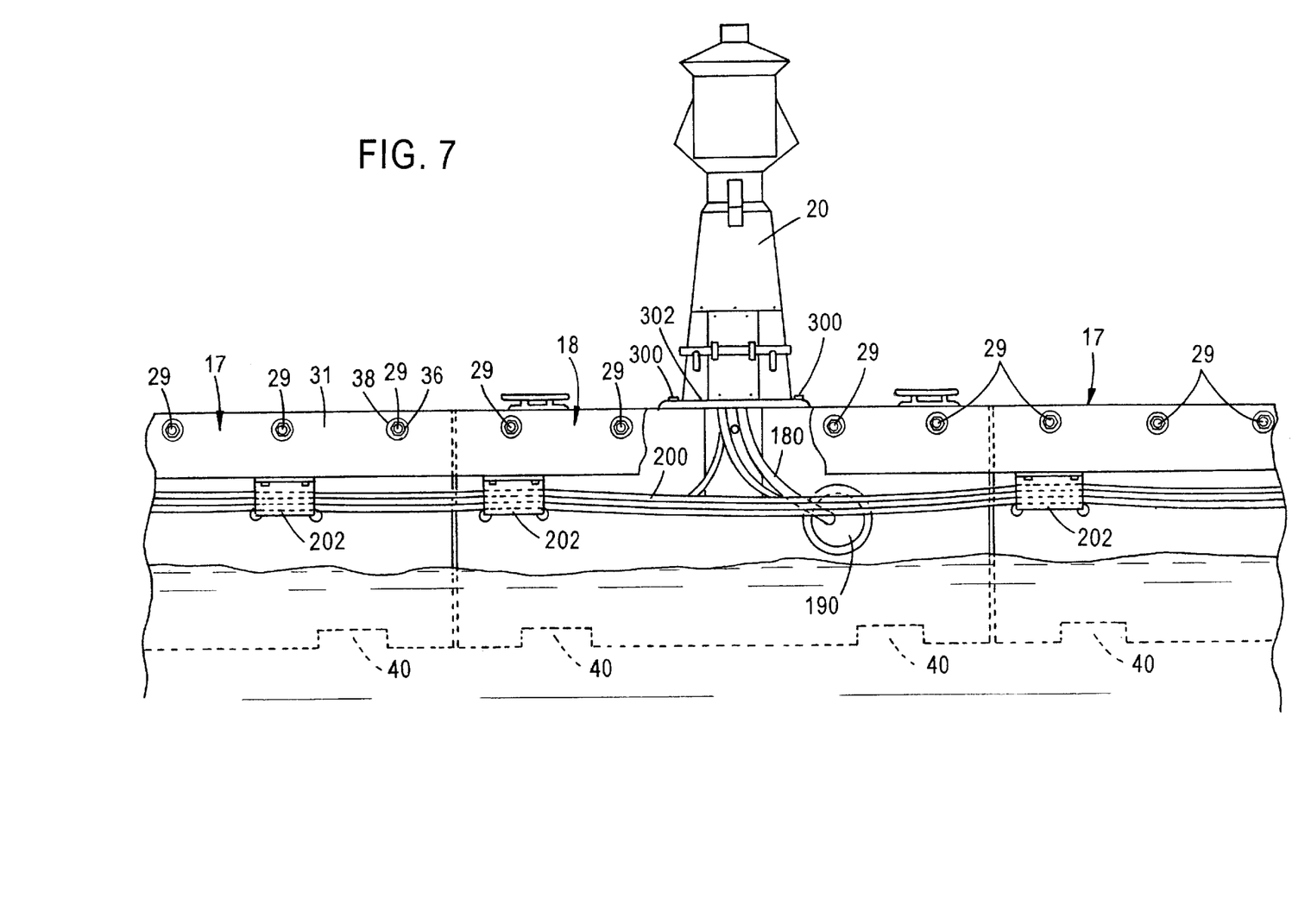
FIG. 7 is a side view of a portion of the floating dock of FIG. 1 including a floating dock wharf module carrying a utility tower.

As illustrated in FIG. 7, utility clips 202 carry utility lines 200 close to the concrete deck portions of modules 17 and 18. The positioning of utility clips 202 and the center of buoyancy and center of gravity of modules 17 and 18 are such that utility lines 200 are always considerably above the water line of the body of water on which dock 10 is floating.

Some of the lines in the utility lines 200 extend through module 18 into utility tower 20, for connection to vessels that dock at dock 10 in proximity to tower 20. Other lines in utility lines 200 extend through other modules (not shown) similar to module 18, thence to other utility towers (not shown) similar to tower 20.

Figure 2:
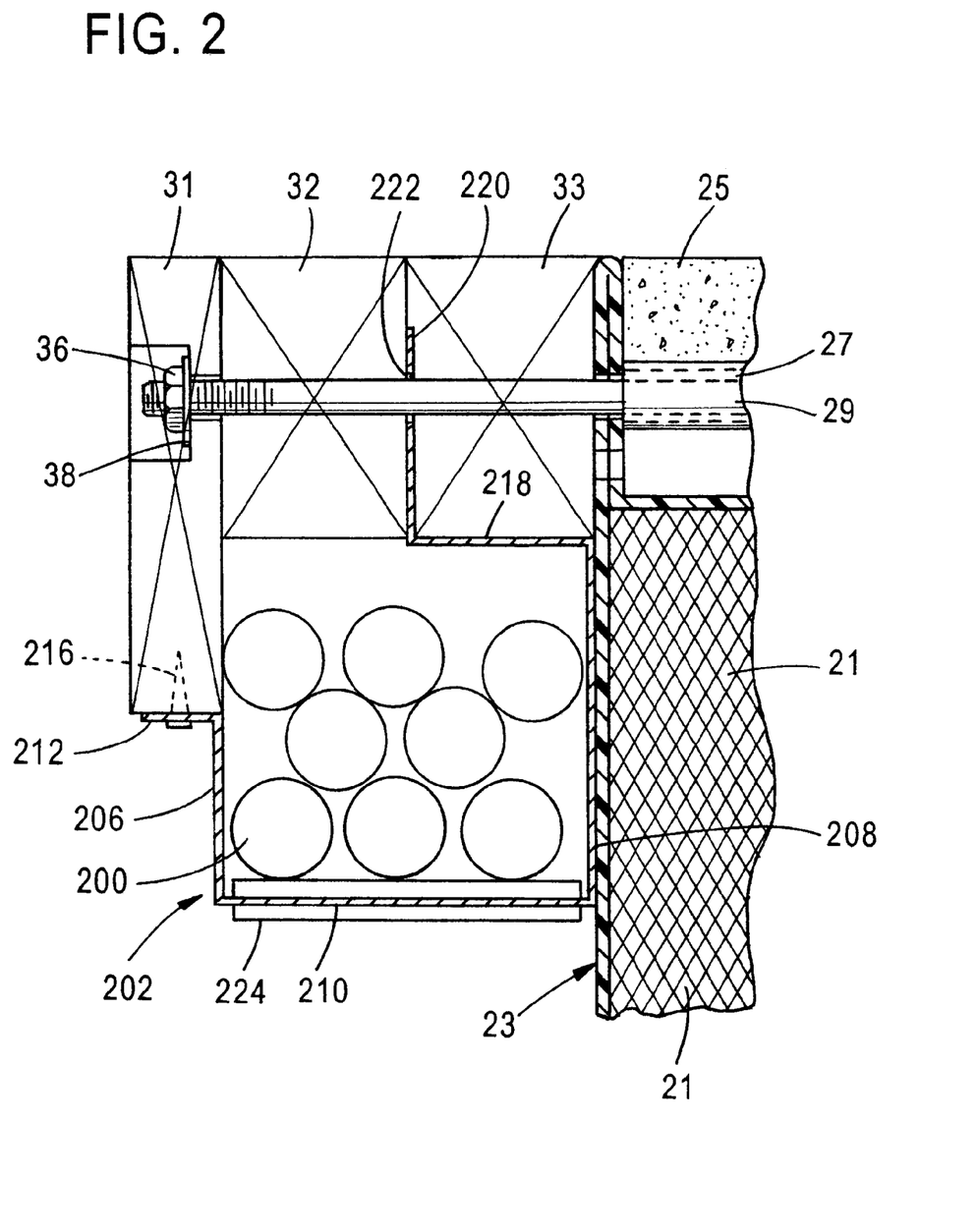
FIG. 2 is a side sectional view of a clip for carrying utility lines, as mounted on a floating dock wharf module illustrated in FIG. 1.
Figure 3:
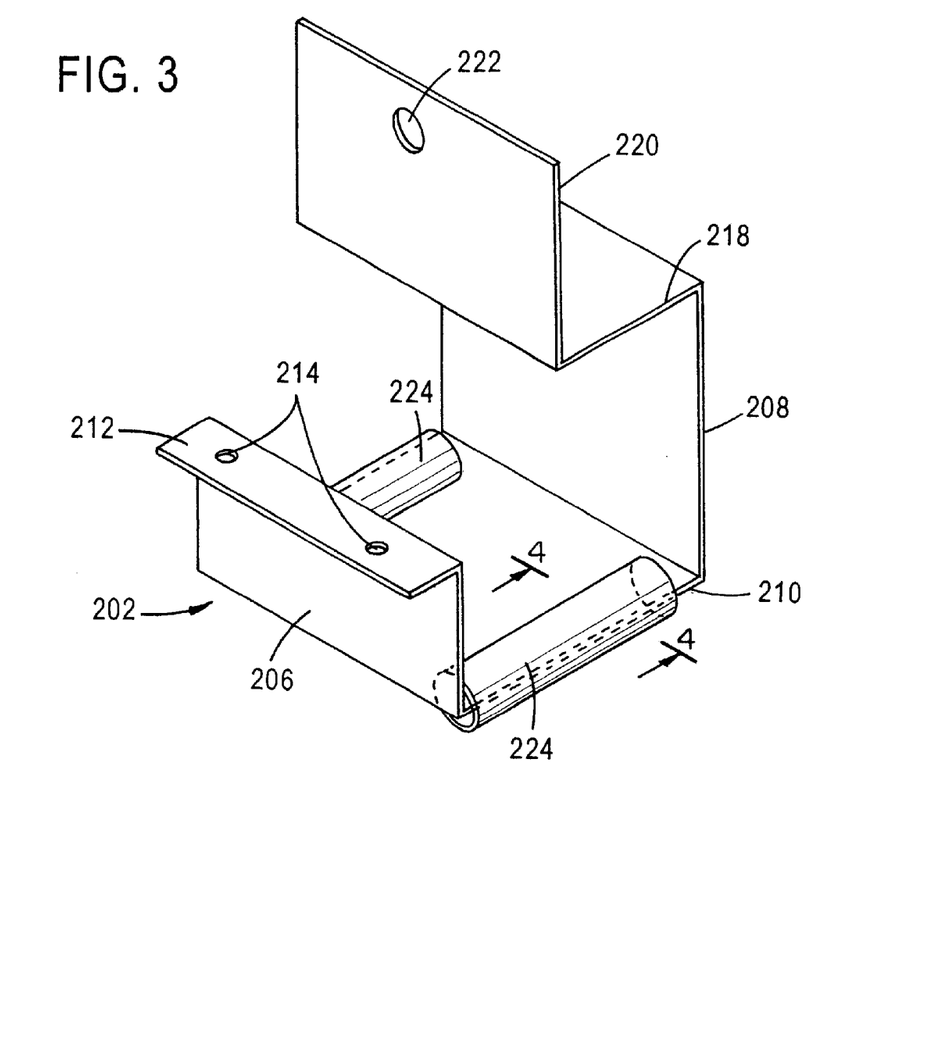
FIG. 3 is a perspective view of the clip illustrated in FIG. 2.
Figure 4:
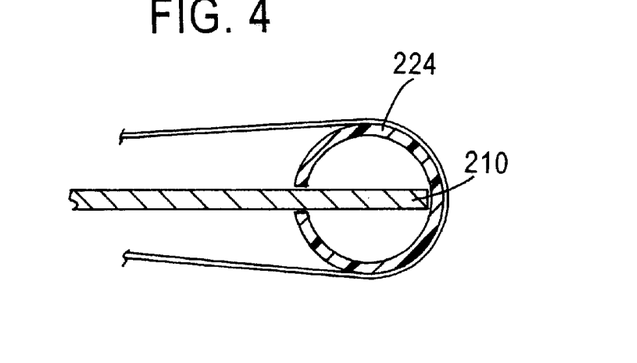
FIG. 4 is a sectional view taken through the lines 4—4 of FIG. 3.

Each of utility clips 202 is constructed the same so that a description of utility clip 202 illustrated in FIGS. 2–4 suffices for the remaining utility clips.

Utility clip 202, preferably made of galvanized sheet steel, is secured in place between (1) the exterior wall of shell 23, (2) the lower horizontal face of wale 33, (3) abutting vertical sides of wales 32 and 33, and (4) the lower face of wale 31. Clip 202, shell 23 and wales 31–33 form a closed volume for a relatively large number of utility lines 200 that extend longitudinally along the outboard side of modules 17 and 18 of row 13 of main pier portion 12.

Clip 202 includes a pair of vertically extending outer side walls 206 and 208, connected to each other by horizontally extending base 210. Horizontal flange 212 extends outwardly from wall 206 and includes a pair of circular openings 214 close to each longitudinal end thereof. Lag bolts 216 extend through the circular openings 214 in flange 212 and are screwed into the lower horizontal face of wale 31 to fixedly mount a first end of clip 202 to the remainder of dock 10.

Utility clip 202 also includes roof 218 and interior wall 220. Roof 218 extends from the top edge of side wall 208 toward wall 206, and ends approximately half way between walls 206 and 208. Wall 220 extends upwardly from the end of roof 218 remote from wall 208. Wall 220 lies in a vertical plane that is substantially coincident with the vertical plane between abutting walls of wales 32 and 33. Wall 220 includes a circular hole 222 through which rod 29 fits. Wall 220 is held in place by the compressive force exerted on it by the abutting walls of wales 32 and 33 when nut 36 is tightened against the wall of a counter bore on the exterior wall of wale 31 to fixedly mount a second end of clip 202 to the remainder of dock 10. The length of rod 29 is such that the rod does not extend beyond the side wall of wale 31 so the rod cannot contact and damage the hulls of vessels docked along wales 31–33.

Clip 202 is secured in place by placing wall 220 between wales 32 and 33 with hole 222 in alignment with corresponding bores of wales 32 and 33 prior to (1) rod 29 being inserted all the way through the bore in wale 33 and (2) wale 31 being brought into contact with wale 32. Then rod 29 is inserted through the aligned bores of wales 32 and 33 and hole 222. Then a nut and washer combination is attached to the threaded end of rod 29, without wale 31 in place, so the nut and washer bear against the exposed side wall of wale 32. After all the clips 202 have been secured to dock 10 in this manner, utility lines 200 are placed in the clips. Then the nuts and washers bearing against the exposed side wall of wale 32 are removed and wale 31 is put in place so a bore of wale 31 is aligned with rod 29. Rod 29 is then pushed through the bore of wale 31. Then the nut and washer are fastened to the threaded end of rod 29 to bear against the wall of the counter sunk hole in wale 31. Then lag bolts 216 are screwed into the lower horizontal face of wale 31 through the circular openings in flange 212.

To service or change the number of utility lines in clip 202, lag bolts 216 and the nut and washer combination in the bore of wale 31 are removed. Then wale 31 is removed to provide access to the volume where utility lines 200 are located. After the service or change in the number of lines has been completed, wale 31 is replaced as described previously.

As a result of the way utility clip 202 is securely held in place and the relatively large volume within the clip when it is secured in place, the utility clip is able to carry a substantial number of utility lines 200 without bending. In addition, because of the closed, gapless construction of utility clip 202, the utility clip retains its shape in the event of a collision between a vessel and dock 10, even in the immediate vicinity of the utility clip. The gapless construction of utility clip 202 protects the utility lines 200 from outside influences.

Because utility lines 200 usually include electrical conductors, it is important to space the utility lines from base 210 to prevent wearing of the cables and possible electric short circuits. Thus it is important to minimize electric and mechanical contact between utility lines 200 and base 210 of utility clip 202. To these ends, opposite edges of base 210 carry plastic sleeves 224, preferably made of polyvinyl chloride. Sleeves 224 include lengthwise slits that fit over the opposite edges of base 210 extending at right angles to the lengths of wales 31–33. Sleeves 224 have sufficiently large diameters and are hard enough to withstand the weight of utility lines 200 without deflecting substantially, so that the utility lines are spaced from all parts of the base. Sleeves 224 are soft enough to prevent rubbing damage to the portions of utility lines 200 that the sleeves contact.

Figure 5:
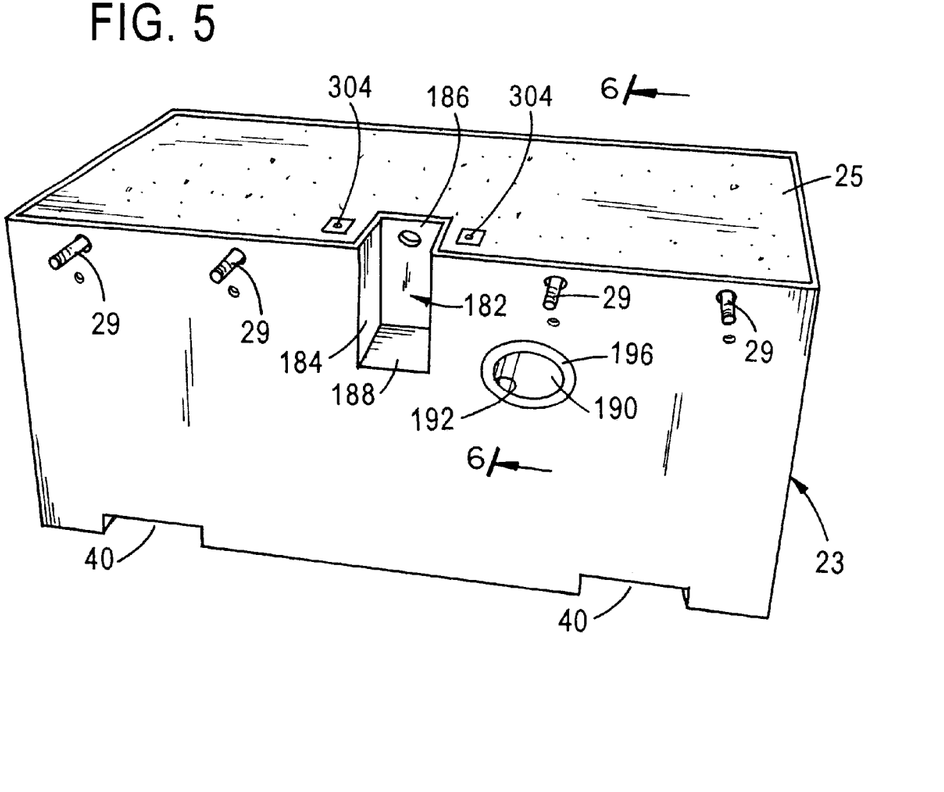
FIG. 5 is a perspective view of a buoyant wharf module for carrying a utility tower, as included in the dock of FIG. 1.
Figure 6:
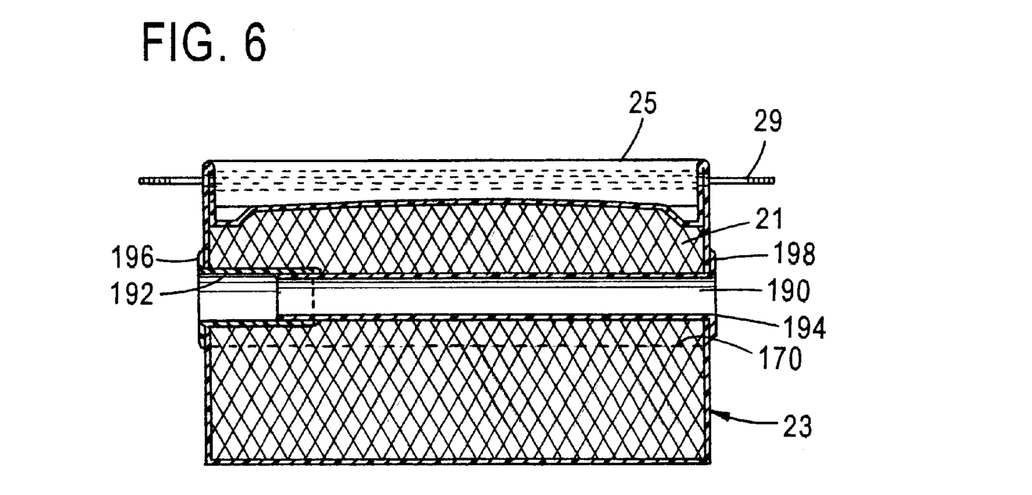
FIG. 6 is a side sectional view of the wharf module illustrated in FIG. 5, taken through the lines 6—6.

One or more lines in utility lines 200 extend into utility tower 20 of utility module 18. A preferred construction of utility module 18 and the way the utility lines carried by clips 202 and the spacers between rows 13 and 15 are illustrated in FIGS. 5–7.

Module 18 includes a transverse cylindrical tunnel, i.e., opening, 190 in foam mass 21 of shell 23. Tunnel 190 extends between the longitudinal walls of shell 23. Tunnel 190 is approximately aligned with one of rods 29 that is close to but not on the vertical center line of module 18. Tunnel 190 is slightly above horizontal center line 170 of module 18. Tunnel 190 is lined by telescoping tubes 192 and 194, so the ends of tubes 192 and 194 overlap. Tubes 192 and 194 are preferably formed of an organic compound, e.g., polyvinyl chloride, and the overlapping portions thereof are bonded together within the tunnel 190 to form a water impervious liner.

Tubes 192 and 194 respectively include flanges 196 and 198 having interior walls bonded to the opposite, longitudinal walls of shell 23. Tubes 192 and 194 preferably have an inner diameter of about four inches to enable one or more utility lines 180 to easily extend through tunnel 190 from the gap between rows 13 and 15 to the outboard side of row 13.

Module 18 includes cut-out region 182 on its outboard longitudinal side. Region 182 enables utility lines 180 and 200 to have access to utility tower 20 through the base of the tower. Region 182, shaped as a right parallelepiped, includes vertically extending parallel side walls 184, back wall 186, floor 188, a front opening across the outboard wall of module 18 and an open top. Region 182 thus forms a depression in the deck of module 18; the depression is high, wide and deep enough to enable utility lines 180 and 200 to easily fit into it and extend vertically into tower 20 through an opening in the base of the tower.

Region 182 is preferably equidistant between exterior, transverse walls of module 18 to assist in enabling module 18 to ride evenly in water. In a preferred embodiment, region 182 has a height of about nine inches, so base 188 thereof is approximately aligned with the top of tunnel 190; the width and depth of region 182 are both preferably about four inches.

Four bolts 300 (only two of which are illustrated) fasten tower 20 to the deck of module 18, so the base of the tower surrounds the opening at the top of cutout region 182 and the openings in the base of tower 20 and at the top of region 182 are aligned. Two of bolts 300 extend through circular openings in flange 302 at the base of tower 20 into threaded bores of sockets 304 that are encased in concrete deck 25.

The other two bolts are lag bolts that extend through circular openings in flange 302 into outboard wale 31. Utility lines 180 and 200 extend through the aligned openings after passing through region 182.

While there has been described and illustrated a specific embodiment of the invention, it will be clear that variations in the details of the embodiment specifically illustrated and described may be made without departing from the true spirit and scope of the invention as defined in the appended claims.

We claim:

1. A floating dock for carrying utility lines comprising an elongated pier portion having an elongated outboard side, a wale arrangement on the elongated outboard side, a plurality of utility clips for carrying the utility lines, the utility clips being fixedly mounted to the wale arrangement and the outboard side, the utility clips being arranged and positioned to completely enclose a volume, the volume being such that the utility lines can be located therein, the dock including a plurality of transverse rods extending to the elongated outboard side, each of the clips including a wall with an opening through which one of the rods extends, a fastener arrangement for connecting the rods to the wale arrangement, the fastener arrangement causing a force to be exerted on the wale arrangement and the wall to hold the wall of each clip in place relative to the wale arrangement, the wale arrangement including first and second wales having adjacent sides, the wall fitting between and abutting the adjacent sides so the adjacent sides exert a compressive force on the wall to hold the wall in situ.

2. The floating dock of claim 1 wherein the wale arrangement includes a third wale having a side abutting a side of another wale of the wale arrangement, the first and second wales being between the third wale and the remainder of the dock, the third wale having a surface abutting and fixedly connected to a surface of the clip.

3. The floating dock of claim 2 wherein said surface of the wale is a horizontal surface.

4. The floating dock of claim 3 wherein said surface of the third wale is substantially below all surfaces of the first and second wales.

5. A floating dock for carrying utility lines comprising an elongated pier portion having an elongated outboard side, a wale arrangement on the elongated outboard side, a plurality of utility clips for carrying the utility lines, the utility clips being fixedly mounted on the wale arrangement and the outboard side, the utility clips being arranged and positioned to completely enclose a volume, the volume being such that the utility lines can be located therein, a plurality of wharf modules, a plurality of rods extending transversely of each of the modules and extending through the wale arrangement, a fastener arrangement holding the rods, modules and transversely of each of the modules and extending through the wale arrangement, a fastener arrangement holding the rods, modules and wales together, each of the clips including a wall with an opening through which one of the rods extend, the fastener arrangement causing a force to be exerted on the wale arrangement and the wall to hold the wall of each clip in place relative to the wale arrangement, the wale arrangement including first and second wales having adjacent sides, the wall fitting between and abutting the adjacent sides so the adjacent sides exert a compressive force on the wall to hold the wall in situ.

6. The floating dock of claim 5 wherein the wale arrangement includes a third wale having a side abutting a side of another wale arrangement, the first and second wales being between the third wale and the remainder of the dock, the third wale having a surface abutting and fixedly connected to a surface dock of the clip.

7. The floating dock of claim 6 wherein said surface of the wale is a horizontal surface.

8. The floating dock of claim 7 wherein said surface of the third wale is substantially below all surfaces of the first and second wales.

9. A floating dock for carrying utility lines comprising an elongated pier portion having an elongated outboard side, a wale arrangement on the elongated outboard side, a plurality of utility clips for carrying the utility lines, the utility clips being fixedly mounted to the wale arrangement and the outboard side, a plurality of transverse rods extending to the elongated outboard side, each of the clips including a wall with an opening through which one of the rods extends, a fastener arrangement for connecting the rods to the wale arrangement, the fastener arrangement causing a force to be exerted on the wale arrangement and the wall to hold the wall of each clip in place relative to the wale arrangement, the wale arrangement including first and second wales having adjacent sides, the wall fitting between and abutting the adjacent sides so the adjacent sides exert a compressive force on the wall to hold the wall in situ.

10. the floating dock of claim 9 wherein the wale arrangement includes a third wale having a side abutting a side of another wale of the wale arrangement, the first and second wales being between the third wale and the remainder of the dock, the third wale having a surface abutting and fixedly connected to a surface of the clip.

11. The floating dock of claim 10 wherein said surface of the wale is a horizontal surface.

12. The floating dock of claim 11 wherein said surface of the third wale is substantially below all surfaces of the first and second wales.

13. The floating dock of claim 9 wherein the dock includes a plurality of wharf modules, one of said rods and plural further rods extending transversely of each of the modules and extending through the wale arrangement, a fastener arrangement holding all the rods, modules and wales together.

14. A floating dock for carrying utility lines comprising an elongated pier portion having an elongated outboard first side and another elongated second side substantially parallel to and opposite from the first side, a plurality of utility clips mounted on the first side for carrying some of the utility lines, a structure mounted on the second side for carrying others of the utility lines, a mounting for a utility tower in proximity to one of said sides on a deck of the dock, the dock including a solid buoyant lower portion having a tunnel extending between the first and second sides for carrying at least one utility line from the side opposite to said one side to said one side, the tunnel ending on said one side close to the mounting so that the at least one utility line extending through the tunnel can extend into the utility tower, said one side including a depression, the depression including an opening in the deck close to the mounting, the utility tower including an opening in its base, the mounting and the openings in the deck and the base being such that the at least one utility line and at least one utility line on the first side can extend through the depression and the openings into the tower.

15. The floating dock of claim 14 wherein the pier portion includes a plurality of interconnected buoyant wharf modules, one of the wharf modules including one of the clips, the depression, the tunnel and the mounting.

16. A floating dock for carrying utility lines comprising an elongated pier portion having an elongated outboard first side and another elongated second side substantially parallel to and opposite from the first side, a plurality of utility clips mounted on the first side for carrying some of the utility lines, a structure mounted on the second side for carrying others of the utility lines, a mounting for a utility tower in proximity to one of said sides on a deck of the dock, the dock including a solid buoyant lower portion having a tunnel extending between the first and second sides for carrying at least one utility line from the side opposite to said one side to said one side, the tunnel ending on said one side close to the mounting so that the at least one utility line extending through the tunnel can extend into the utility tower, said one side including a depression, the utility lines and the tower being secured to the mounting so the openings in the tower and the depression are aligned, some of the utility lines extending through the depression and the openings, at least one of the utility lines extending through the tunnel, thence through the depression and the aligned openings.

17. The floating dock of claim 16 further including a wale arrangement on the first side, the utility clips being fixedly mounted to the wale arrangement and the first side, the utility clips being arranged and positioned to completely enclose a volume, the volume being such that the utility lines can be located therein.

18. The floating dock of claim 17 wherein the dock includes a plurality of transverse rods extending to the elongated sides, each of the clips including a wall with an opening through which one of the rods extends, a fastener arrangement for connecting the rods to the wale arrangement, the fastener causing a force to be exerted on the wale arrangement and the wall to hold the wall of each clip in place relative to the wale arrangement.

19. A floating dock for carrying utility lines comprising an elongated pier portion having an elongated side, a plurality of utility clips fixedly mounted on the elongated side for carrying the utility lines, each of the clips having a metal floor carrying a non-metallic spacer arrangement extending above the floor for preventing contact of the utility lines with the floor.

20. A floating dock of claim 19 wherein the spacer arrangement for each clip includes a pair of tubes each having an elongated slit, each clip having opposite substantially parallel edges, one of the tubes being carried by each edge so that each edge extends into a slit of the tube associated with each edge.

21. A floating dock of claim 20 wherein each of the tubes is an electric insulator.

* * * * *